United States Patent
Gierth

(10) Patent No.: US 6,568,890 B2
(45) Date of Patent: May 27, 2003

(54) INSIDE BROACHING MACHINE

(76) Inventor: Lothar Gierth, Im Schnitthölzchen 36, D-58802 Balve (DE)

( * ) Notice: Subject to any disclaimer, the term of this patent is extended or adjusted under 35 U.S.C. 154(b) by 0 days.

(21) Appl. No.: 10/094,925

(22) Filed: Mar. 8, 2002

(65) Prior Publication Data

US 2002/0127074 A1 Sep. 12, 2002

(30) Foreign Application Priority Data

Mar. 9, 2001 (DE) ..................... 201 04 159 U

(51) Int. Cl.⁷ .............................................. B23D 41/08
(52) U.S. Cl. ......................................... 409/281; 409/280
(58) Field of Search ............................... 409/267, 268, 409/285, 264, 280, 281, 283, 284, 200

(56) References Cited

U.S. PATENT DOCUMENTS

| 3,103,852 A | * | 9/1963 | Bonnafe ..................... 409/285 |
| 3,180,231 A | * | 4/1965 | Abbot, Jr. .................. 409/247 |
| 4,030,402 A | * | 6/1977 | Onsrud ....................... 409/229 |
| 4,756,630 A | | 7/1988 | Teeslink ...................... 384/30 |
| 5,755,539 A | * | 5/1998 | Takeuchi et al. ............ 409/275 |
| 6,409,442 B1 | * | 6/2002 | Berktold et al. ............. 409/269 |

FOREIGN PATENT DOCUMENTS

| DE | 42 35 145 | | 4/1994 | |
| EP | 0296069 | * | 12/1988 | ................. 409/281 |
| JP | 402167617 | * | 6/1990 | ................. 409/200 |
| JP | 2002-96217 | * | 4/2002 | ................. 409/275 |

* cited by examiner

Primary Examiner—William Briggs
(74) Attorney, Agent, or Firm—Collard & Roe, P.C.

(57) ABSTRACT

An inside broaching machine having an upper pressure cylinder and a lower drawing cylinder that can be displaced in a machine rack. A machine table with receiving means, receives work pieces in parallel, and the broaching tools extending through the machine table each can be locked on the pressure carriage and the drawing carriage in tool holders. The machine exerts pressure and tensile force in the course of the broaching operation. The broaching tools are held clamped on the pressure carriage and the drawing carriage in radially clamping tool holders through the broaching operation. The two carriages are coupled in a force-locked manner.

8 Claims, 5 Drawing Sheets

INSIDE BROACHING MACHINE

BACKGROUND

The invention relates to an inside broaching machine with an upper pressure carriage and a lower drawing carriage that are displaceable in a machine rack. A machine table, that receives the work pieces that are to be broached in parallel alignment, is arranged between the carriages. The broaching tools that penetrate the machine table can be locked in the pressure carriage and the drawing carriage.

A vertical broaching machine for internal broaching work is known from DE 42 35 145 A1. An upper pressure carriage that is spaced apart from a lower drawing carriage, can be displaced as a joint broaching carriage via a common drive. A stationary machine table receives work pieces that are to be mounted. It also includes tool-holding devices both on the pressure carriage and the drawing carriage. The shafts or ends of the broaching tools (broaching needles), can be locked in the tool holders. The broaching machines are used either as pressure broaching machines or drawing broaching machines depending on whether the vertically arranged broaching tools are fixed on the pressure carriage or on the drawing carriage.

The known machines are used for working inside drilled holes or grooves. The broaching tools are pushed or drawn past the inside surfaces that are worked. The known machines are disadvantageous because the broaching tools are clamped on only one side while they are in use. In pressure broaching machines, the load limit is restricted by the buckling rigidity of the relatively elongated, spindle-like broaching tools. In drawing broaching machines, the unilateral fixing of the long broaching tool in the drawing carriage has an adverse effect wherein the other end of the tool is capable of yielding radially, resulting in the formation of inaccuracies on the surface.

This invention proposes an inside broaching machine that avoids the drawbacks of the known pressure and drawing machines and allows the broaching treatment of work pieces with high accuracy, high driving forces, and high production output rates.

SUMMARY

The invention relates to an inside broaching machine with broaching tools locked to an upper pressure carriage and a lower drawing carriage both displaceably mounted in a machine rack. The decisive advantage offered by the present invention is that pressure and tensile force are applied to the broaching tools at the same time while the broaching tool is clamped on both sides. The broaching tools are precisely guided in this connection as the broaching work is being performed. The buckling stress acting on the tools is reduced by applying pressure and tensile force simultaneously, wherein these machines are capable of operating with high working accuracy and capable of maintaining a long useful life.

Vices with radially clamping jaws are preferably used as tool holders, whereby the broaching tools are additionally supported in the upper tool holder in the axial direction.

Additional features provide for detachable, force-locked coupling of the pressure carriage with the drawing shafts, which also permits the removal of the broaching tool after the broaching work has been completed.

The associated machine table may be arranged in the machine rack either in a stationary manner or mounted in the machine rack so that it can be displaced against the direction in which the pressure carriage is working. The relative displaceability of the machine table permits a reduction of the height of the overall construction of the machine, especially of a vertical inside broaching machine.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION

Figure 1:
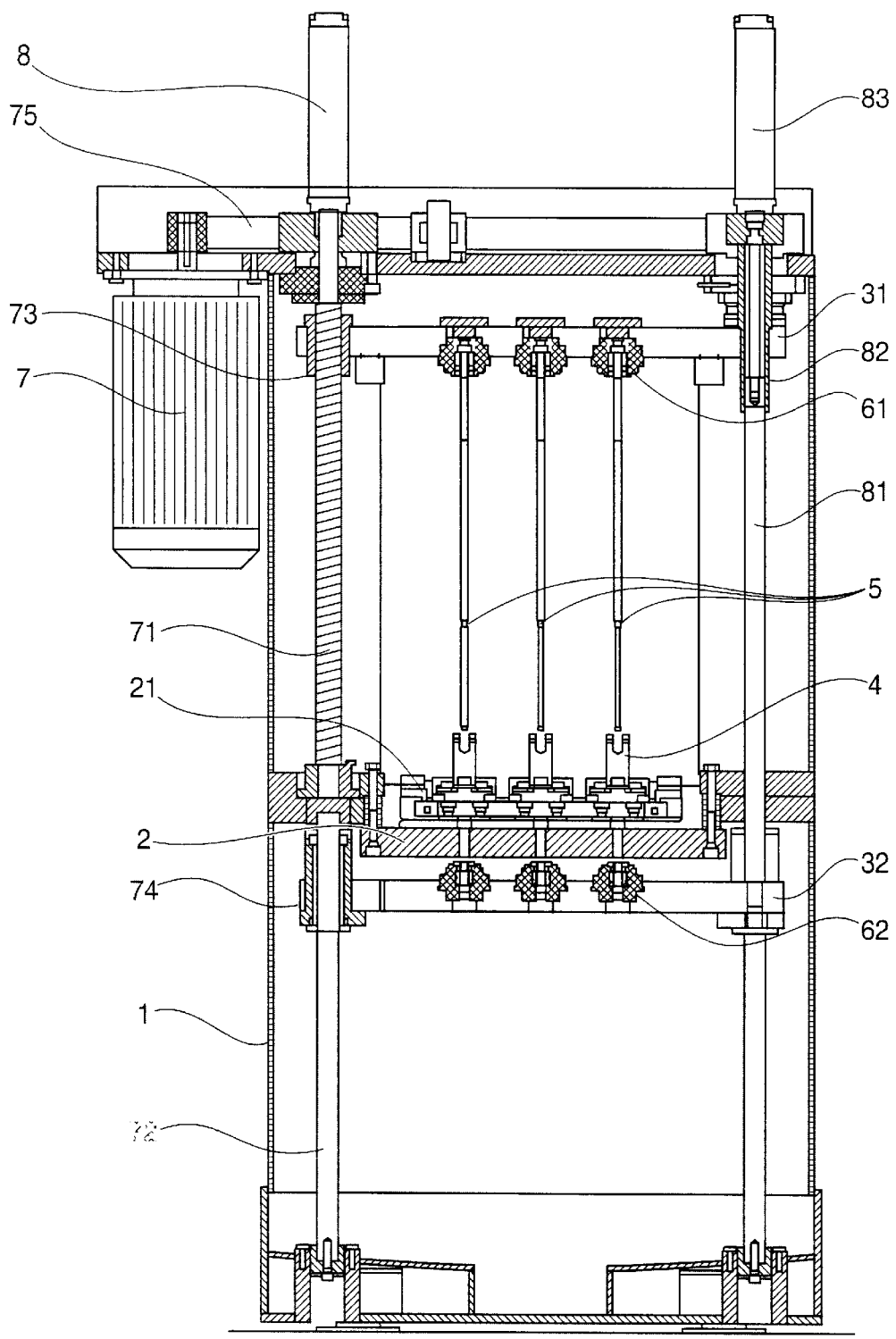
FIG. 1 is a partially sectional side view of the machine with three broaching tools mounted parallel with each other in the basic position before they are driven into the work pieces.

Referring to the drawings FIG. 1 shows a vertical inside broaching machine. This machine contains a broaching carriage unit which is driven in a machine rack 1 and can be vertically displaced via a drive motor 7, a toothed belt drive 75, and spindles 71. The broaching carriage unit is comprised of an upper pressure carriage 31, which is guided with nuts 73 serving as the ball spindle drive, and a lower drawing carriage 32. Pressure carriage 31 and drawing carriage 32, which is spaced from pressure carriage 31, can be coupled to each other in a force-locked and detachable manner.

A machine table 2 with centering means for receiving work pieces 4 is arranged on machine rack 1 in a stationary manner between carriages 31 and 32. Work pieces 4 are fork-like parts with drilled inside holes that have to be worked.

To reduce the height of a vertical inside broaching machine, machine table 2 may be arranged so that it can be displaced against the working direction of pressure carriage 31.

Two spindles 71 are supported on stationary machine table 2 in suitable bearings. Guide bars 72, which are aligned with spindles 71, are arranged on machine table 2, point downwards, and are supported at the bottom of machine rack 1. Drawing carriage 32 is guided on guide bars with sleeves 74.

FIG. 1 shows that before the broaching work is started, needle-like broaching tools 5 are supported on upper pressure carriage 31 in radially clamping tool holders 61 on their face sides. Broaching tools 5 are coaxially aligned with work pieces 4, with their receiving means, or with tool holders 21 on machine table 2.

Figure 2:
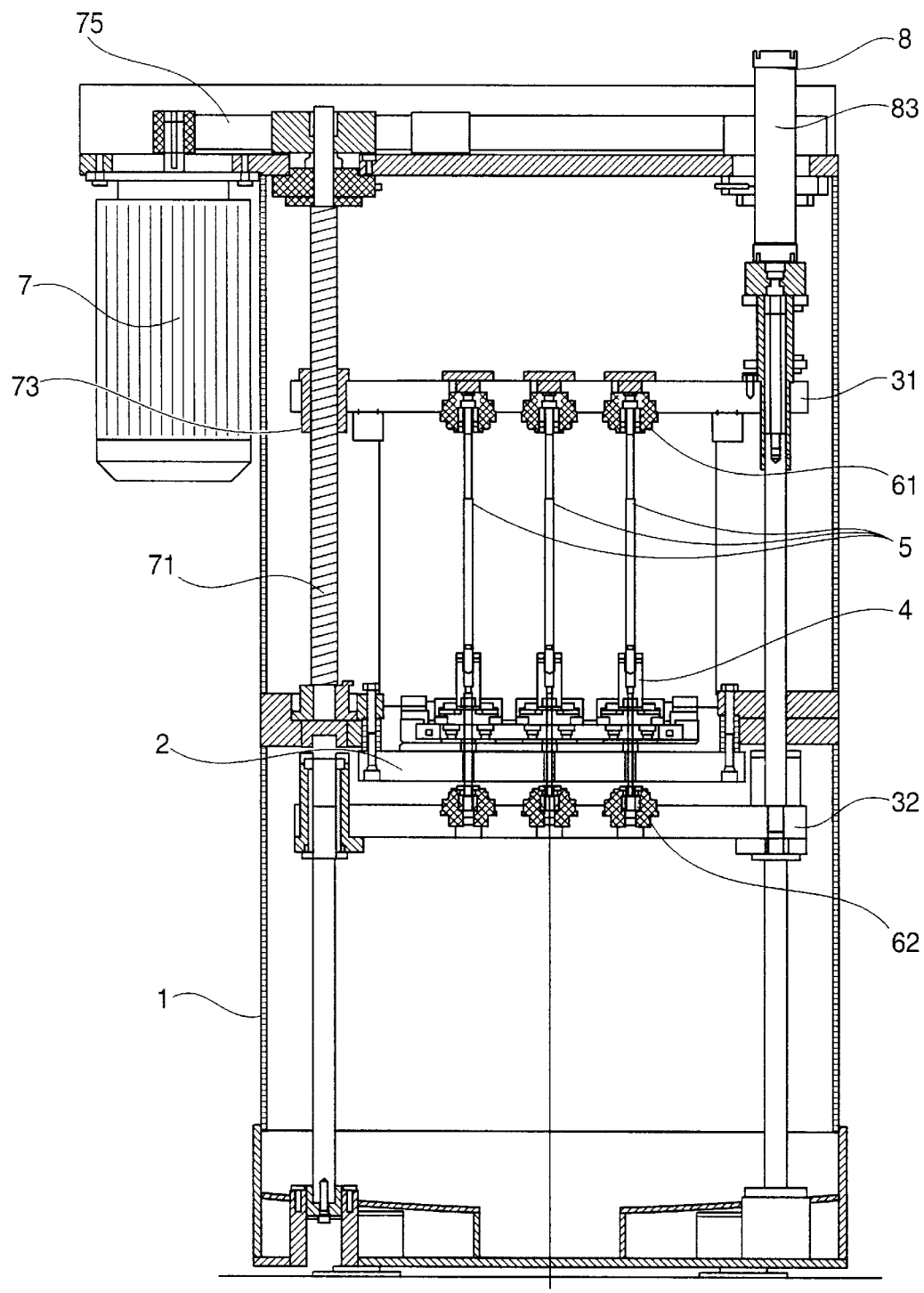
FIG. 2 shows the working position conforming to FIG. 1, in which the broaching tools are guided through the work pieces, and the machine table is supported radially clamped in the broaching tool holders of the lower drawing carriage.

FIG. 2 shows that by displacing upper pressure carriage 31, broaching tools 5 are driven into work pieces 4. Broaching tools 5 then penetrate work pieces 4 and machine table 2 and, in their final positions, engage tool holders 62 on lower drawing carriage 32, which can be radially clamped as well. Radially clamping jaws of a vice, serving as tool holders 61 and 62, are on upper pressure carriage 31 and lower drawing carriage 32. When in the position shown in FIG. 2, upper pressure carriage 31 is coupled in a force-locked manner with lower drawing carriage 32 via the elements of an auxiliary drive 8. There is also a compressed-air cylinder 82 with a compressed air reservoir 83 mounted thereon. Compressed-air cylinder 82 is connected with upper pressure carriage 31 in a fixed way. The two-component piston, whose lower component 81 is connected with lower drawing carriage 32 in a fixed manner, is displaceable in a driven manner in compressed-air cylinder 82. Therefore, in such an arrangement, when upper pressure cylinder 31 is displaced in the downward direction, lower drawing carriage 32 is displaced downwards as well and pulls clamped broaching tools 5 downwards. The carriage unit comprised of upper pressure carriage 31 and lower drawing carriage 32 subjects broaching tools 5 to both pressure and tensile force.

Figure 3:
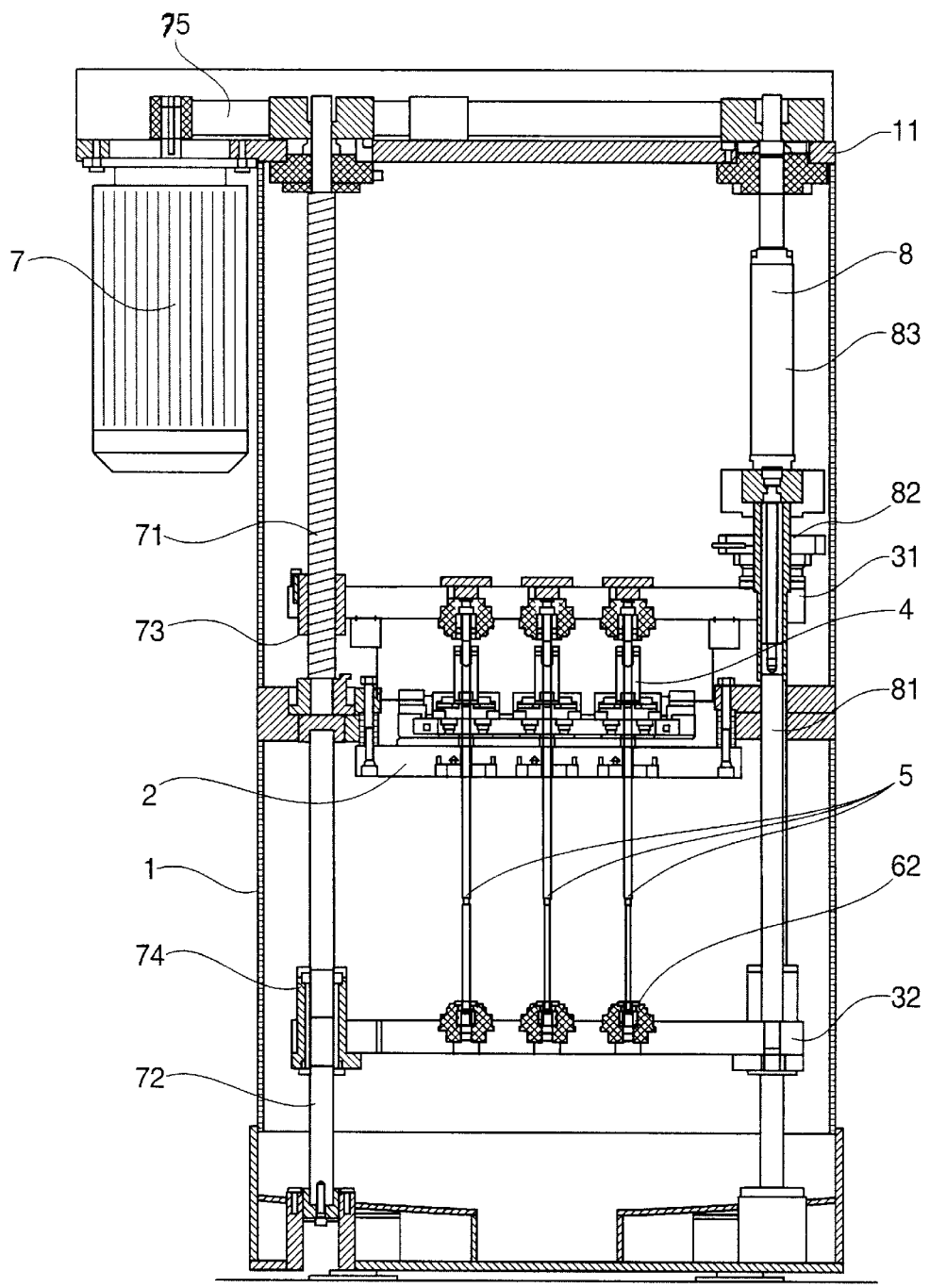
FIG. 3 is a representation corresponding with the preceding figures, showing the working position after the broaching work has been completed.
Figure 4:
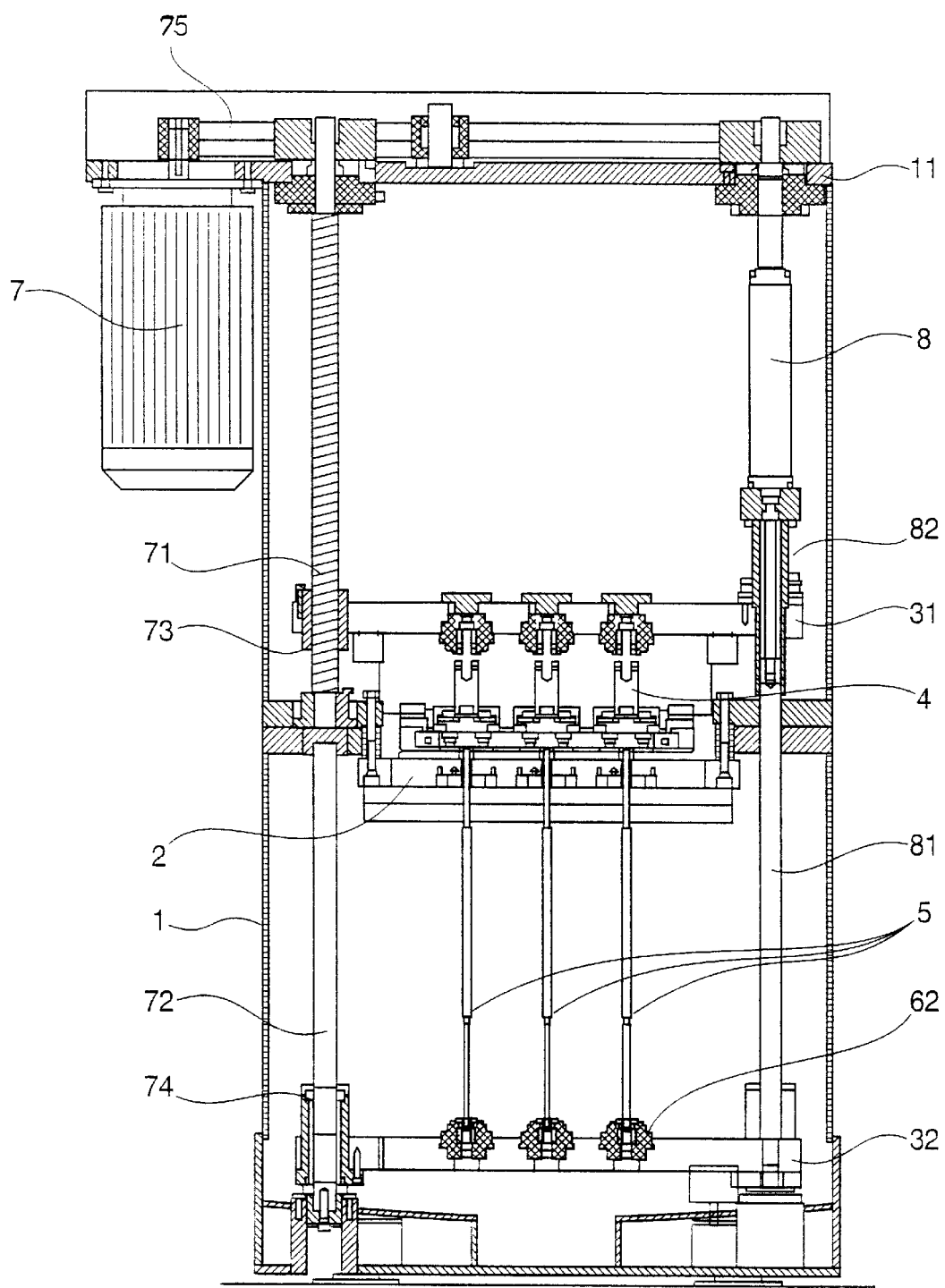
FIG. 4 is a corresponding representation after the lower drawing carriage has been displaced into its bottom position, in which the broaching tools have been driven out of the work pieces.
Figure 5:
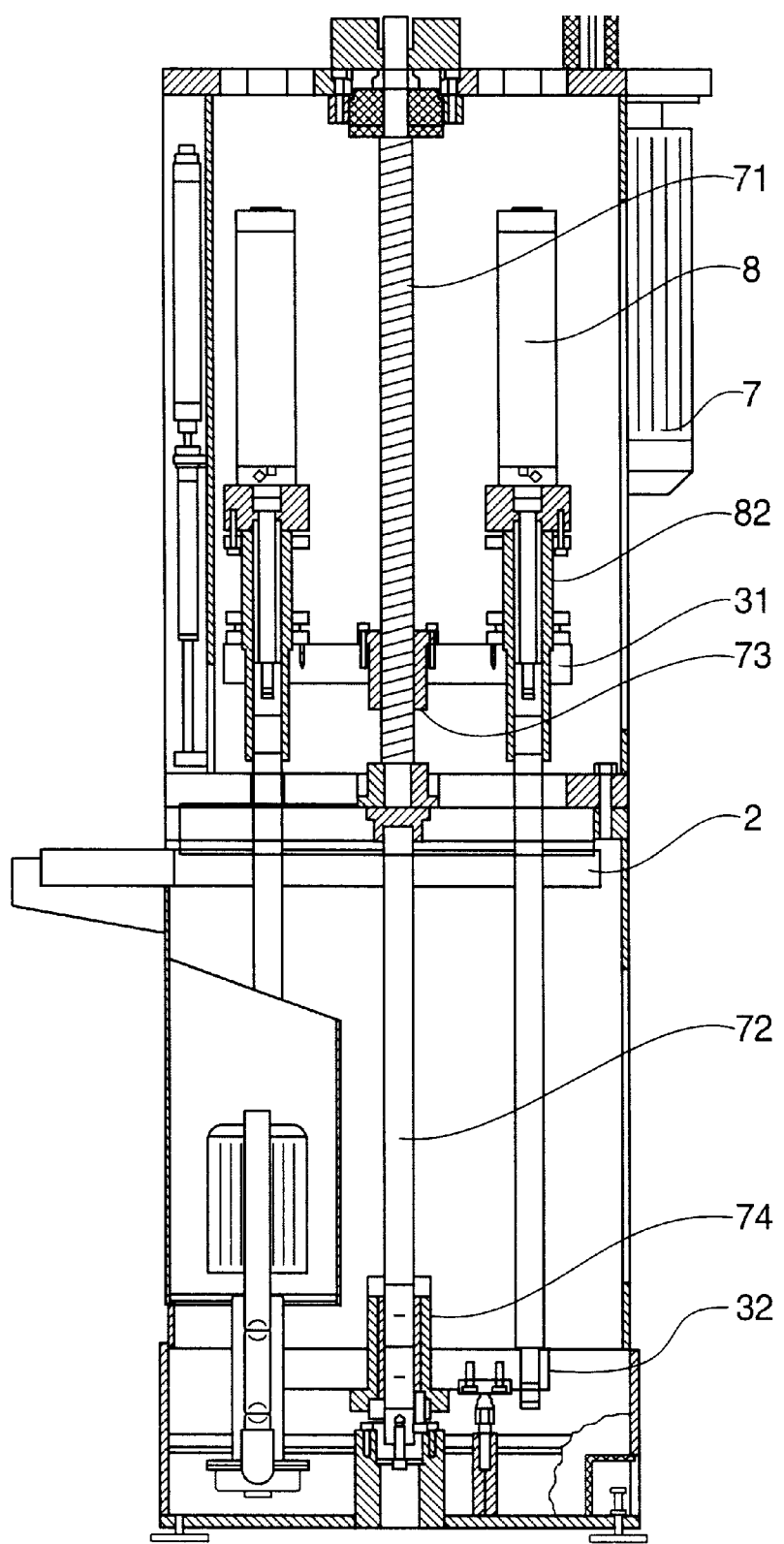
FIG. 5 is a partial sectional side view relating to the representation in FIG. 4.

After the broaching tools have been completely driven through work pieces 4, carriages 31 and 32 reach the positions shown in FIG. 3.

After the positions shown in FIG. 3 have been reached, upper tool holders 61 are released and broaching tools 5 are subsequently pulled from the finished work pieces via auxiliary drive 8. Drawing carriage 32 displaces further in the downward direction, so that the work pieces can be removed in the horizontal direction.

For setting the machine up again, the carriages and the broaching tools can be driven back into a starting position according to FIG. 1, in a manner not shown.

Accordingly, while at least one embodiment of the present invention has been shown and described, it is to be understood that many changes and modifications may be made thereunto without departing from the spirit and scope of the invention as defined in the appended claims.

What is claimed is:

1. An inside broaching machine driven in a machine rack (1) comprising:
   an upper pressure carriage (31) displaceably mounted in the machine rack;
   a lower drawing carriage (32) displaceably mounted in the machine rack below said upper pressure carriage;
   a machine table (2) mounted between said upper pressure carriage (31) and said lower drawing carriage (32) in the machine rack (1)
   at least one receiving means disposed on said machine table to hold at least one work piece in the broaching machine;
   a plurality of tool holders wherein there is at least one upper tool holder (61, 62) disposed on said upper pressure carriage (31), and at least one lower tool holder disposed on said lower drawing carriage; and
   at least one broaching tool (5) extending through said machine table (2), wherein said at least one broaching tool (5) is lockable in said at least one tool holder (61, 62) on said upper pressure carriage (31) and said lower drawing carriage (32);
   wherein said upper pressure carriage (31) and said lower drawing carriage (32) have drives coupled to move in a force locked manner, and simultaneously apply pressure and tensile force in the course of broaching work when said at least one broaching tool (5) is held clamped in said tool holders (61, 62) on said upper pressure carriage (31) and said lower drawing carriage (32).

2. The broaching machine according to claim 1, wherein said plurality of tool holders (61, 62) are vices with radially clamping jaws.

3. The broaching machine according to claim 1, wherein said at least one broaching tool (5) is held in said at least one upper tool holder (61) with additional support in the axial direction.

4. The broaching machine according to claim 1, further comprising auxiliary drives (8) that displace said lower drawing carriage (32) in relation to said pressure carriage (31) after said broaching tools (5) have been released from said lower tool holders (62).

5. The broaching machine according to claim 1, wherein said machine table (2) is mounted in the machine rack (1) in a stationary manner.

6. The broaching machine according to claim 1, wherein said machine table (2) can be displaced against the working direction of said upper pressure carriage (31).

7. The broaching machine according to claim 1, further comprising a plurality of spindle drives (71) and a common drive (7, 75) wherein said spindle drives are driven by said common drive, said spindle drives are vertically arranged on the side of the machine rack and said spindle drives displace said upper pressure carriage (31).

8. The broaching machine according to claim 4, wherein said auxiliary drive (8) comprises a compressed-air cylinder (82) with a compressed-air reservoir (83) mounted thereon, wherein said air cylinder (82) is connected with said upper pressure carriage (31) in a fixed manner, and the lower segment (81) of a two-component piston displaceable in said compressed-air cylinder (82), is connected with said lower drawing carriage (32) in a fixed manner.

* * * * *